United States Patent [19]

Tatani et al.

[11] Patent Number: 5,053,061
[45] Date of Patent: Oct. 1, 1991

[54] GAS-LIQUID CONTACTING METHOD

[75] Inventors: Atsushi Tatani; Susumu Okino; Masakazu Onizuka, all of Kanonshin, Japan

[73] Assignee: Mitsubishi Jukogyo Kabushiki Kaisha, Japan

[21] Appl. No.: 435,692

[22] Filed: Nov. 13, 1989

[30] Foreign Application Priority Data

Nov. 14, 1988 [JP] Japan .................. 63-285869

[51] Int. Cl.$^5$ ............................... B01D 53/18
[52] U.S. Cl. ........................... 55/90; 55/94; 55/95
[58] Field of Search .......... 55/84, 90, 94, 95, 233, 55/240, 256; 261/98, 115–118

[56] References Cited

U.S. PATENT DOCUMENTS

| | | | |
|---|---|---|---|
| 1,777,277 | 9/1930 | Lednum | 261/117 |
| 3,399,511 | 9/1968 | Geiringer | 55/84 X |
| 3,944,402 | 3/1976 | Cheremisinoff | 55/233 X |
| 4,047,891 | 9/1977 | Schuetz | 55/84 X |
| 4,157,250 | 6/1979 | Regehr et al. | 55/233 |
| 4,460,552 | 7/1984 | Zakrzewski | 261/98 X |
| 4,553,991 | 11/1985 | Barsacq | 55/256 X |
| 4,610,840 | 9/1986 | Leach | 55/256 X |
| 4,762,686 | 8/1988 | Lehto | 55/256 X |

FOREIGN PATENT DOCUMENTS

| | | | |
|---|---|---|---|
| 0687417 | 5/1964 | Canada | 55/84 |
| 0248288 | 8/1987 | German Democratic Rep. | 55/84 |
| 52-005063 | 1/1977 | Japan | 55/94 |
| 59-53828 | 4/1984 | Japan. | |
| 0878201 | 9/1961 | United Kingdom | 261/117 |

Primary Examiner—Robert Spitzer
Attorney, Agent, or Firm—Toren, McGeady & Associates

[57] ABSTRACT

A gas-liquid contacting method which using a gas-liquid contacting facility comprised with a tower having a reservoir for a gas absorbing liquid at the bottom part and a space for the flow of a gas to be treated in the upper part, a header pipe installed in the tower, a pump for feeding the gas absorbing liquid to the header pipe from the reservoir of the gas absorbing liquid, a throat pipe attached to the header pipe, a discharge pipe with cross-sectional area greater than the cross-sectional area of the throat pipe, and a diffuser pipe that connects the throat pipe and the discharge pipe, whereby the gas absorbing liquid boils under low pressure, by making the cross-sectional area of the throat pipe to be sufficiently smaller than the cross-sectional area of the discharge pipe, then squirting the gas absorbing liquid into the gas to be treated from the discharge pipe.

4 Claims, 5 Drawing Sheets

GAS-LIQUID CONTACTING METHOD

FIELD OF THE INVENTION AND RELATED ART STATEMENT

The present invention relates to a gas-liquid contacting method to be used for cleaning harmful components in a gas to be treated with an absorbing liquid or for collecting soluble components in a gas to be treated with an absorbing liquid, and more particularly to a gas-liquid contacting method applicable to a wet type stack gas desulfurization facility or the like.

As the prior art techniques of gas-liquid contacting method, a variety of methods such as the spray tower, packed column tower, venturi scrubber and bubble tower systems have been developed and put to practical use. However, each one of these systems has its own advantages and disadvantages in performance and features, so that the development of a high-performance gas-liquid contacting method that is furnished with the advantages of these methods has been expected.

The present applicant proposed a gas-liquid contacting facility which provides the above-mentioned method, as disclosed in Japanese Utility Model Application No. 57-146860 (application filed as of Sept. 28, 1982, Japanese Utility Model Laid Open No. 59-53828).

Figure 5:
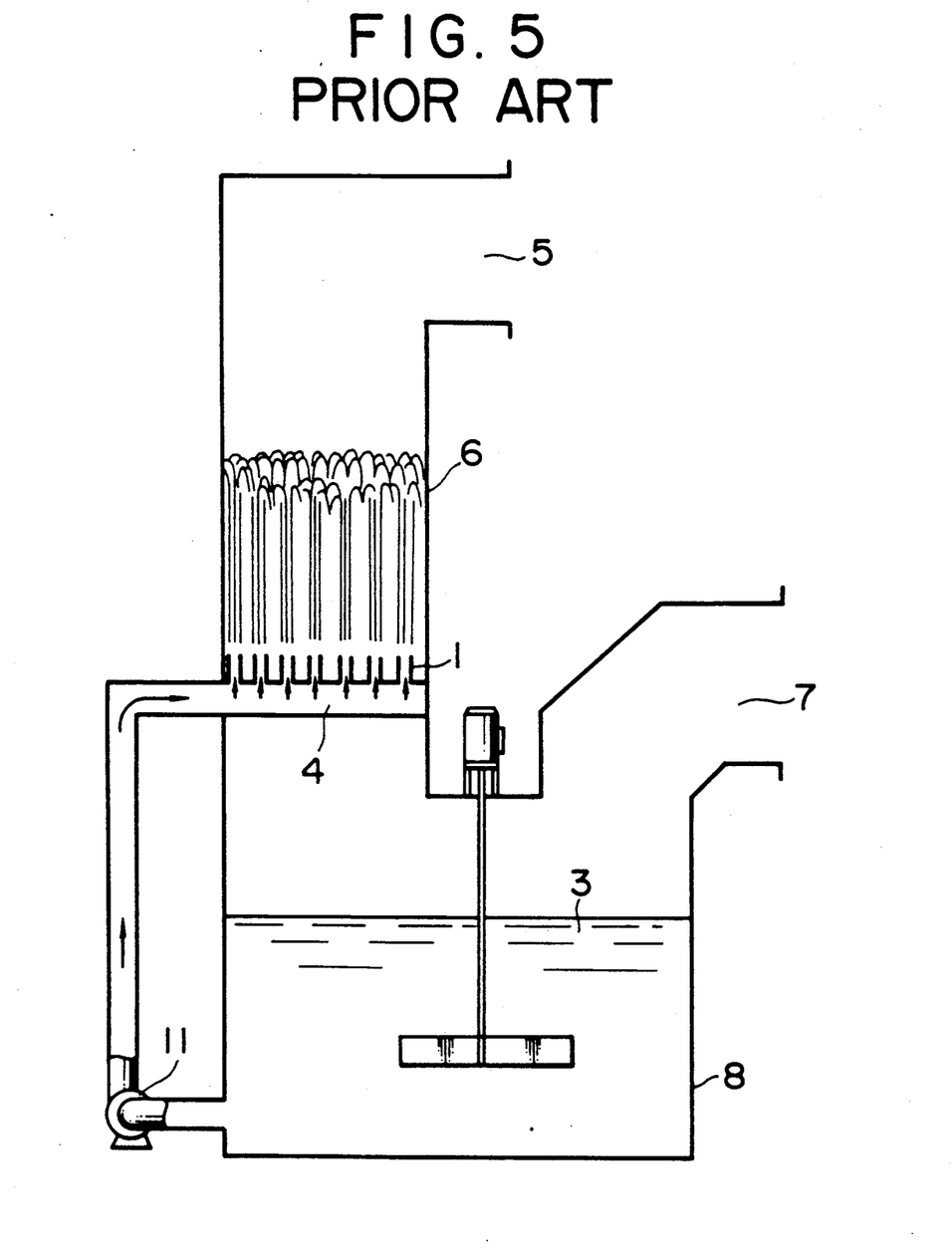
FIG. 5 is a vertical sectional view of the prior art gas-liquid contacting facility.

Referring to FIG. 5, the above-mentioned gas-liquid contacting facility will be described.

In the gas-liquid contacting facility, an inlet and an outlet for a gas to be treated are arranged so as to have one of them to be disposed in the upper part of a tower while the other to be in the lower part, and a plurality of discharge pipes that discharge a gas absorbing liquid substantially in the upward direction are arranged in the tower. The gas absorbing liquid is discharged substantially in the upward direction into the gas to be treated so as to contact with the gas to be treated. The efficiency of the gas-liquid contact can be varied by adjusting the height of the liquid columns.

Namely, in FIG. 5, 5 and 7 are the inlet and outlet for the gas to be treated, 6 is the tower main body, and in the tower a plurality of discharge pipes 1 are arranged in a header pipe 4 to discharge a gas absorbing liquid 3 substantially in the upward direction in the form of liquid columns. Normally a plurality of the header pipes need not be arranged to be in the same plane. The gas absorbing liquid that is discharged from the discharge pipes 1 in the form of liquid columns is brought in from a liquid reservoir which is at the bottom part of the tower by means of a pump 11. The height of the liquid columns can arbitrarily be changed by adjusting the flow rate of the discharged liquid.

After reaching of the gas absorbing liquid at the maximum height of the liquid column, it falls by the earth's gravity and returns to the liquid reservoir 8 at the lower part of the tower. Either one of the parts indicated by the reference symbols 5 or 7 may be chosen as the inlet of the gas to be treated and the other as the outlet.

In the gas-liquid contacting facility shown in FIG. 5, the area covered by the falling liquid after the maximum height, is not wide enough. For this reason, it was necessary to arrange a large number of discharge pipes 1 to the header pipe 4. Because of this, there was such a drawback that the flow rate of the gas absorbing liquid to be used for gas-liquid contact in the tower is large.

OBJECT AND SUMMARY OF THE INVENTION

The object of the present invention is to provide a gas-liquid contacting method of the above-mentioned type which is capable of widely squirting a gas absorbing liquid into a gas to be treated to secure a satisfactory gas-liquid contact.

In order to establish a desirable contact between the gas to be treated and the gas absorbing liquid the gas-liquid contacting method of the present invention adopted the following measures.

(1) A gas to be treated and a gas absorbing liquid are brought into contact by dispersing the gas absorbing liquid after boiling in lower pressure, by bringing the pressure of the gas absorbing liquid to below its vapor pressure.

(2) The gas to be treated and the gas absorbing liquid are brought into contact on the upstream portion of a packing in the gas-liquid contacting method described in (1) above.

(3) A gas is blown into the gas absorbing liquid in advance in the gas-liquid contacting method described in (1) above.

(4) A zeolite is placed in the gas absorbing liquid in the gas-liquid contacting method described in (1) above.

More specifically, it becomes possible to bring the pressure of the gas absorbing liquid to below its vapor pressure by inserting a throat pipe 2 with small diameter connected to the header pipe 4 and a diffuser pipe 12 with gradually increasing diameter provided between the throat pipe 2 and the discharge pipe 1, between the discharge pipe 1 and the header pipe 4 of the gas-liquid contacting facility as shown in FIG. 5. The reason for this will be explained below by making reference to FIG. 1.

Figure 1:
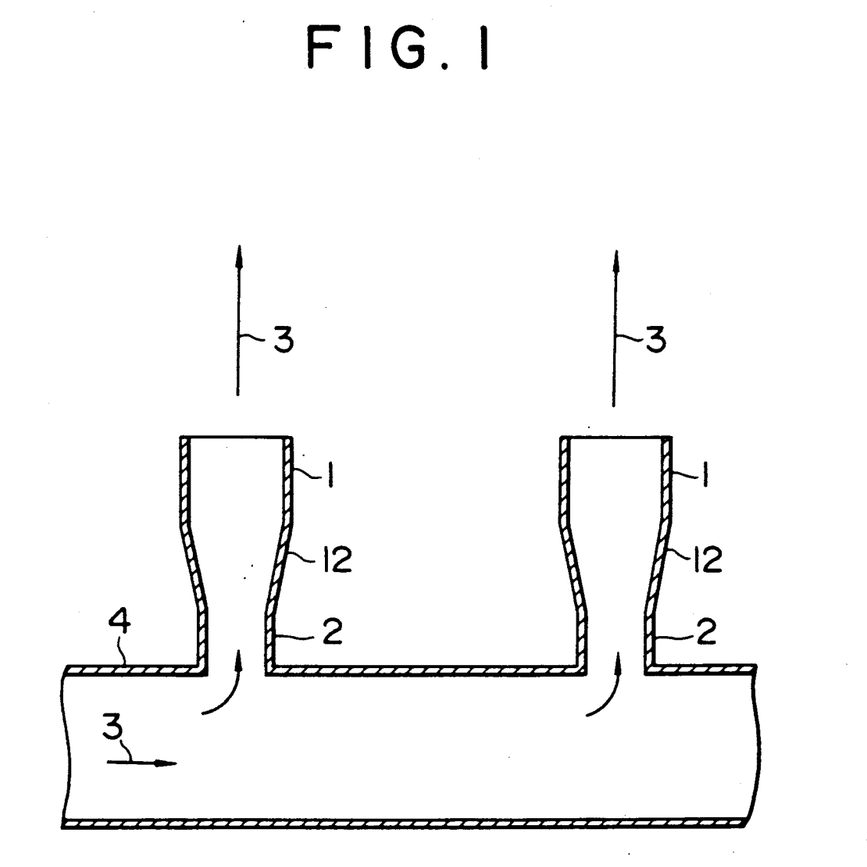
FIG. 1 is a vertical sectional view of the discharging part of the gas absorbing liquid for illustrating the action of the present invention.

In FIG. 1, components identical to those of the prior art gas-liquid contacting facility shown in FIG. 5 are given identical symbols.

Before being sent to the discharge pipe from the header pipe 4, the gas absorbing liquid 3 passes through the throat pipe 2 with a smaller cross-sectional area than that of the discharge pipe 1, and is squirted from the discharge pipe 1 via the diffuser pipe 12 that connects the throat pipe 2 and the discharge pipe 1.

Figure 2A:
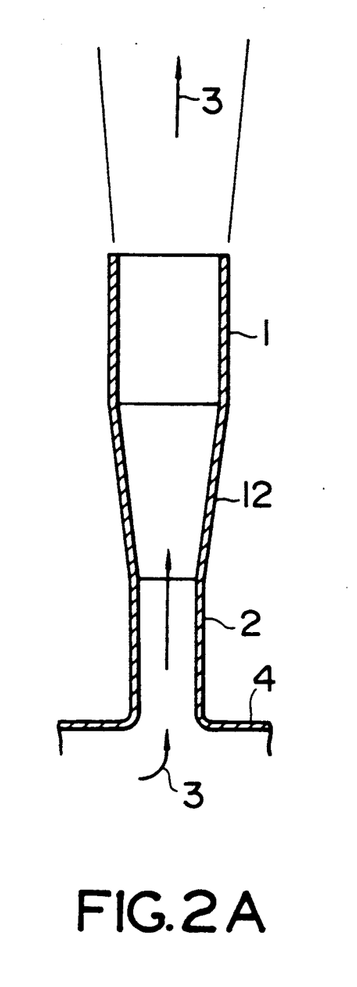
FIG. 2A is an enlarged sectional view of a part of the discharging part shown in FIG. 1.
Figure 2B:
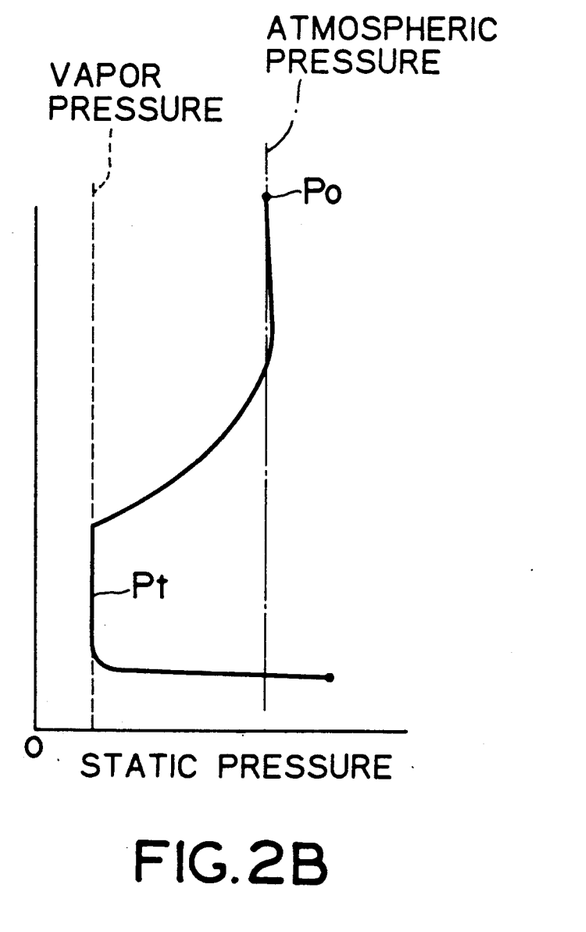
FIG. 2B is a pressure distribution chart of the gas absorbing liquid in the gas absorbing liquid discharging part shown in FIG. 1.

FIG. 2 shows the static pressure at various parts of the gas absorbing liquid in FIG. 1.

The static pressure of the liquid at the point of squirting from the discharge pipe 1 is normally the atmospheric pressure. The static pressure in the throat pipe 2 is lower than that in the discharge pipe 1 corresponding to the difference between the velocity of the liquid within the discharge pipe 1 and the velocity of the liquid within the throat pipe 2 in accordance with the Bernoulli's theorem that is shown below (see FIG. 2).

$$Pi + \rho \times Hi + \frac{\rho \times (Vi)^2}{2 \times g} = \text{const.}, \quad (1)$$

where
Pi is the pressure at a point i, (p)
Hi is the height of the point i from a reference point, (m)
Vi is the flow velocity of the point i, (m/s)
$\rho$ is the density of the gas absorbing liquid, and (kg/m$^3$)
g is the acceleration of the gravity. (m/s$^2$)

Calling the vapor pressure of the gas absorbing liquid Pw (p), the gas absorbing liquid is vacuum-boiled under the condition Pi<Pw. Therefore, the condition for vacuum boiling the liquid at a static pressure Pt within the throat pipe 2 is given by Eq. (2) below.

$$Pw > Pt = Po - \frac{\rho \times (Vd)^2}{2 \times g} \times \left\{ \left(\frac{1}{m}\right)^2 - 1 \right\} + \rho \times \Delta H + \Delta Pl, \quad (2)$$

where
Pw is the vapor pressure of the gas absorbing liquid,
Pt is the static pressure within the throat pipe,
Po is the static pressure at the outlet of the discharge pipe,
Vd is the flow velocity of the liquid within the discharge pipe,
m is given by $$m = \frac{\text{(cross-sectional area of the throat pipe)}}{\text{(cross-sectional area of the discharge pipe)}},$$

$\Delta H$ is the height difference between the outlet of the discharge pipe and the throat pipe, and
$\Delta Pl$ is the pressure loss of the flow path beyond the throat pipe.

Therefore, under the condition of constancy of Vd (namely, the conditions of constancy of the inner diameter of the discharge pipe and the liquid flow rate) by bringing the static pressure within the throat pipe to below the vapor pressure of the gas absorbing liquid through reduction of the cross-sectional area of the throat pipe, hence the value of m, by Eq. (2).

The invention causes the gas absorbing liquid to boil under the lower pressure by bringing the pressure of the gas absorbing liquid to below its vapor pressure through the use of means such as that shown in FIG. 1, and disperses the gas absorbing liquid into the gas to be treated by dispersive power of the liquid brought about by the boiling. A satisfactory gas-liquid contact between the gas to be treated and the gas absorbing liquid can be secured by bringing the dispersed gas absorbing liquid and the gas to be treated into contact.

In addition, the biased flow of the gas passing through without contacting the gas absorbing liquid can be suppressed by this invention, thus there is realized a homogeneous gas-liquid contact between the gas to be treated and the gas absorbing liquid, enhancing the effect of the gas-liquid contact.

In the invention, the gas-liquid contact is arranged to take place on the upstream of a packing to enhance the gas-liquid contact efficiency in the packing, making it possible to obtain a high overall gas-liquid contact efficiency.

In the invention, the dispersion by boiling under lower pressure of the gas absorbing liquid is further enhanced, and the gas-liquid contact efficiency is also enhanced accordingly, by blowing a gas into the gas absorbing liquid.

In the invention, the lower pressure boiling of the gas absorbing liquid is accelerated by the addition of a zeolite to the gas absorbing liquid, and a higher effect of the gas-liquid contact is achieved by improving the dispersion of the gas absorbing liquid.

DETAILED DESCRIPTION OF THE PREFERRED EMBODIMENTS

The embodiments of the present invention will be described below.

In the facility shown in FIG. 3, components identical to those shown in FIG. 5 are shown with identical symbols except for the throat pipe 2 and the diffuser pipe 12 as shown in FIG. 1 and FIG. 2 and a gas feeding pipe that will be described in what follows.

Figure 3:
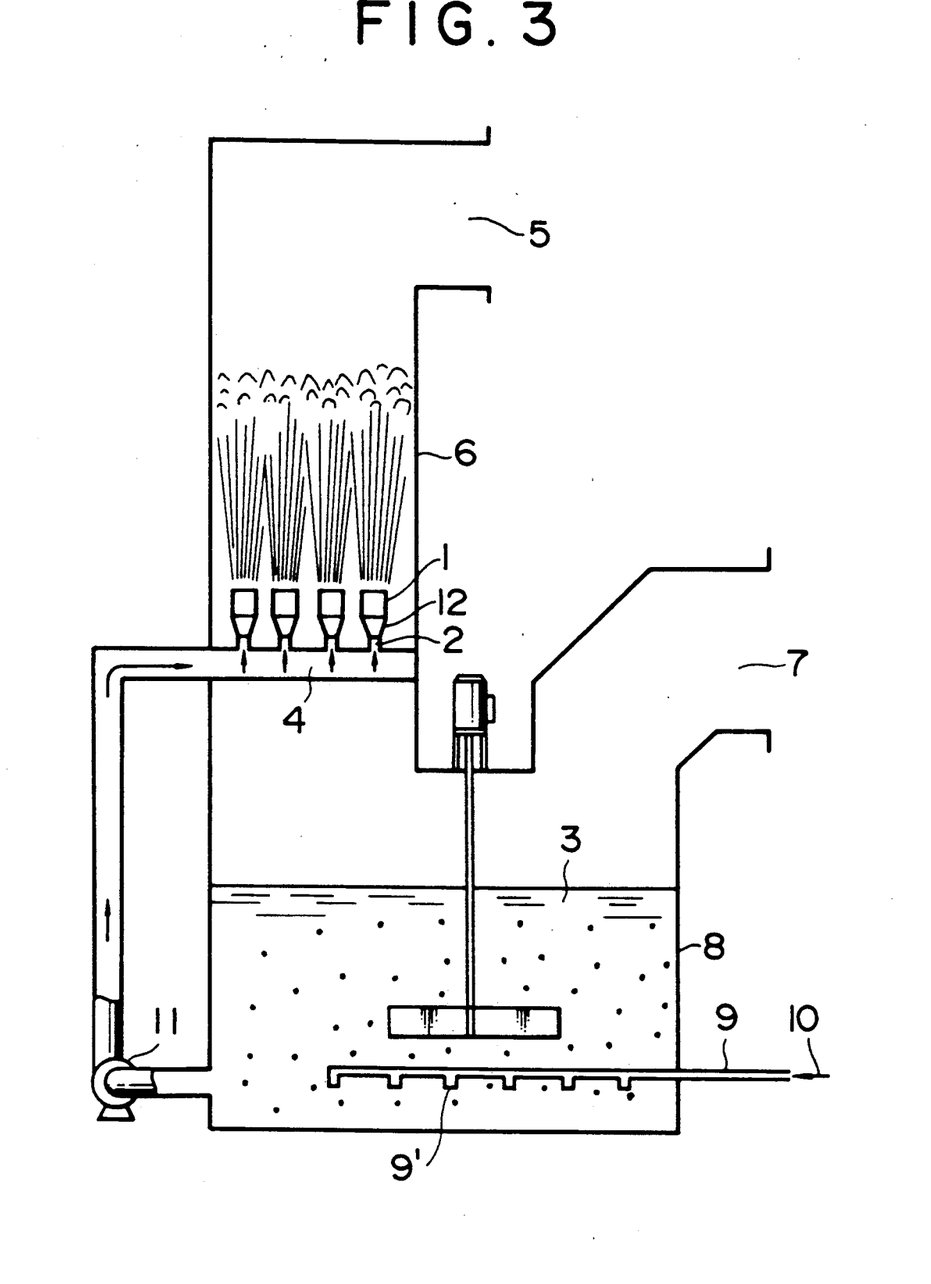
FIG. 3 and FIG. 4 ar respectively vertical sectional views of the gas-liquid contacting facilities used in the embodiments of the present invention.

In FIG. 3, 5 is the inlet for a gas to be treated that is provided in the upper part of the tower 6, and the gas to be treated is introduced through the inlet 5, flows within the tower main body 6 in the downward direction, and goes out from the outlet 7.

A plurality of throat pipes 2 as shown in FIG. 1 and FIG. 2 are provided to the header pipe 4, the diffuser pipe 12 is inserted between the throat pipe 2 and the discharge pipe 1, and the gas absorbing liquid is discharged in the upward direction into the interior of the main body 6 of the tower from the discharge pipes 1.

The lower part of the tower main body 6 forms the reservoir for the gas absorbing liquid 3, a piping that is opened to the reservoir 8 and has a pump 11 arranged in its midway is connected to the header pipe 4, the gas absorbing liquid is sent from the reservoir 8 to the header pipe 4 by means of the pump 11, and the gas absorbing liquid 3 is discharged in the substantially upward direction from the discharge pipes 1. In addition, a gas feeding pipe 9 with openings 9' is provided for the reservoir 8 for the gas absorbing liquid, and a gas 10 is blown into the reservoir 8 of the gas absorbing liquid through the openings 9'.

First Embodiment of the Present Invention

Using the gas-liquid contacting facility shown in FIG. 3, an exhaust gas containing 700 ppm of $SO_2$ fed at a flow rate of 14,000 $m^3/h$ was brought into contact with a $CaCO_3$ slurry used as the gas absorbing liquid.

The gas-liquid contacting facility used has four discharge pipes 1 with inner diameter of 60 mm, the inner diameter of the throat pipe 2 is 36 mm, and the angle of expansion of the diffuser pipe 12 is 5°.

The gas absorbing liquid consisted of 20 wt. % of $CaCO_3$ and water for the remaining part, and this gas absorbing liquid was sent to the header pipes 4 of the gas-liquid contacting facility at the rate of 280 $m^3/h$, and air was not sent to the gas feeding pipe 9. While bursting the gas absorbing liquid in the upward direction from four discharge pipes 4, the exhaust gas was introduced from above the top of the liquid columns of the gas absorbing liquid in the downward direction.

The gas absorbing liquid was 15° C., and its vapor pressure at this temperature is 13 mmHg (−747 mmHg with respect to the atmospheric pressure 760 mmHg), on the other hand the measured internal pressure of the throat pipe 2 was 10 mmHg (−750 mmHg with respect to the atmospheric pressure).

As a result, in the present embodiment, there occurred a lower pressure boiling in the gas absorbing liquid at the throat pipe 2, and the gas absorbing liquid is squirted in the upward direction from the discharge pipes 1, and dispersed satisfactorily into the exhaust gas due to the dispersion.

Thus an active gas-liquid contact took place, and the biased flow of the exhaust gas was suppressed, realizing a homogeneous gas-liquid contact. The concentration of $SO_2$ at the outlet of the exhaust gas was 60 ppm.

Second Embodiment of the Present Invention

With the same conditions as in the first embodiment, air was sent at a rate of 150 m³N/h from the gas feeding pipe provided in the reservoir of the gas absorbing liquid, and the gas absorbing liquid was fed at a rate of 280 m³/h. In this case, the concentration of $SO_2$ of the exhaust gas was 40 ppm at the outlet.

The measured mixing ratio of the gas absorbing liquid extracted from a sampling nozzle provided to the header pipe was 4.0 vol. %.

In the present embodiment by gas blowing-in into the gas absorbing liquid, the gas-liquid contact efficiency is enhanced than in the first embodiment.

As a first comparative example, a gas-liquid contact tested on an exhaust gas containing 700 ppm of $SO_2$ that was sent at the rate of 14,000 m³ N/h, and employing a $CaCO_3$ slurry as the gas absorbing liquid, by using the prior art gas-liquid contacting facility shown in FIG. 5 same as in the first and the second embodiments. The concentration of the slurry in the gas absorbing liquid was 20 wt. %.

By sending the gas absorbing liquid at a rate of 280 m³/h, and introducing the exhaust gas in the downward direction from above the top of the liquid columns of the gas absorbing liquid that was squirted from four discharge pipes with 60 mm inner diameter, the $SO_2$ concentration at the outlet of the exhaust gas was found to be 130 ppm.

Moreover, as a second comparative example, the inner diameter in the first embodiment was changed to 48 mm, and with other conditions identical to those of the first embodiment, the gas absorbing liquid was sent at a rate of 280 m³/h. It was found that the $SO_2$ concentration at the outlet of the exhaust gas was 130 ppm.

The internal pressure of the throat pipe was found to be −280 mmHg with respect the atmospheric pressure, which is not a pressure for inducing the lower pressure boiling of the gas absorbing liquid. The concentration of $SO_2$ at the outlet of the exhaust gas was 130 mmHg which is the same as that of the first comparative example.

As described above, in the first embodiment, the gas-liquid contact efficiency was enhanced by boiling in lower pressure by bringing the pressure of the gas absorbing liquid to below its vapor pressure before the squirt from the discharge pipes. In the second embodiment, the gas-liquid contact efficiency was further enhanced by blowing a gas into the reservoir for the gas absorbing liquid.

Third Embodiment of the Present Invention

Under the conditions identical to those of the first embodiment the slurry concentration of the gas absorbing liquid was sent at a rate of 280 m³/h at the slurry concentration of the gas absorbing liquid to 2 wt. %. The $SO_2$ concentration at the outlet was 100 ppm in this case. The temperature of the gas absorbing liquid was 15° C., and its internal pressure in the throat pipe was measured to be 10 mmHg (−750 mmHg with respect to the atmospheric pressure) satisfying the condition for the lower pressure boiling of the gas absorbing liquid.

Fourth Embodiment of the Present Invention

By adding $CaSO_4.2H_2O$ in addition to $CaCO_3$ as zeolites (the slurry composition of the gas absorbing liquid was 90 to 95% of $CaSO_4.2H_2O$ and the remaining $CaCO_3$) to the gas absorbing liquid in the third embodiment, the gas absorbing liquid was sent at a rate of 280 m³/h by adjusting its slurry concentration to 10 wt. %. The concentration of $SO_2$ at the outlet of the exhaust gas was 60 ppm which was the same absorption efficiency of the first embodiment.

As shown above, in the fourth embodiment it was found that in addition to a remarkably enhanced gas-liquid contact effected by the boiling at the pressure of the gas absorbing liquid below its vapor pressure, it was obtained a still higher gas-liquid contact efficiency by adding $CaCO_3$ and $CaSO_4.2H_2O$ as zeolites into the gas absorbing liquid.

Fifth Embodiment of the Present Invention

Figure 4:
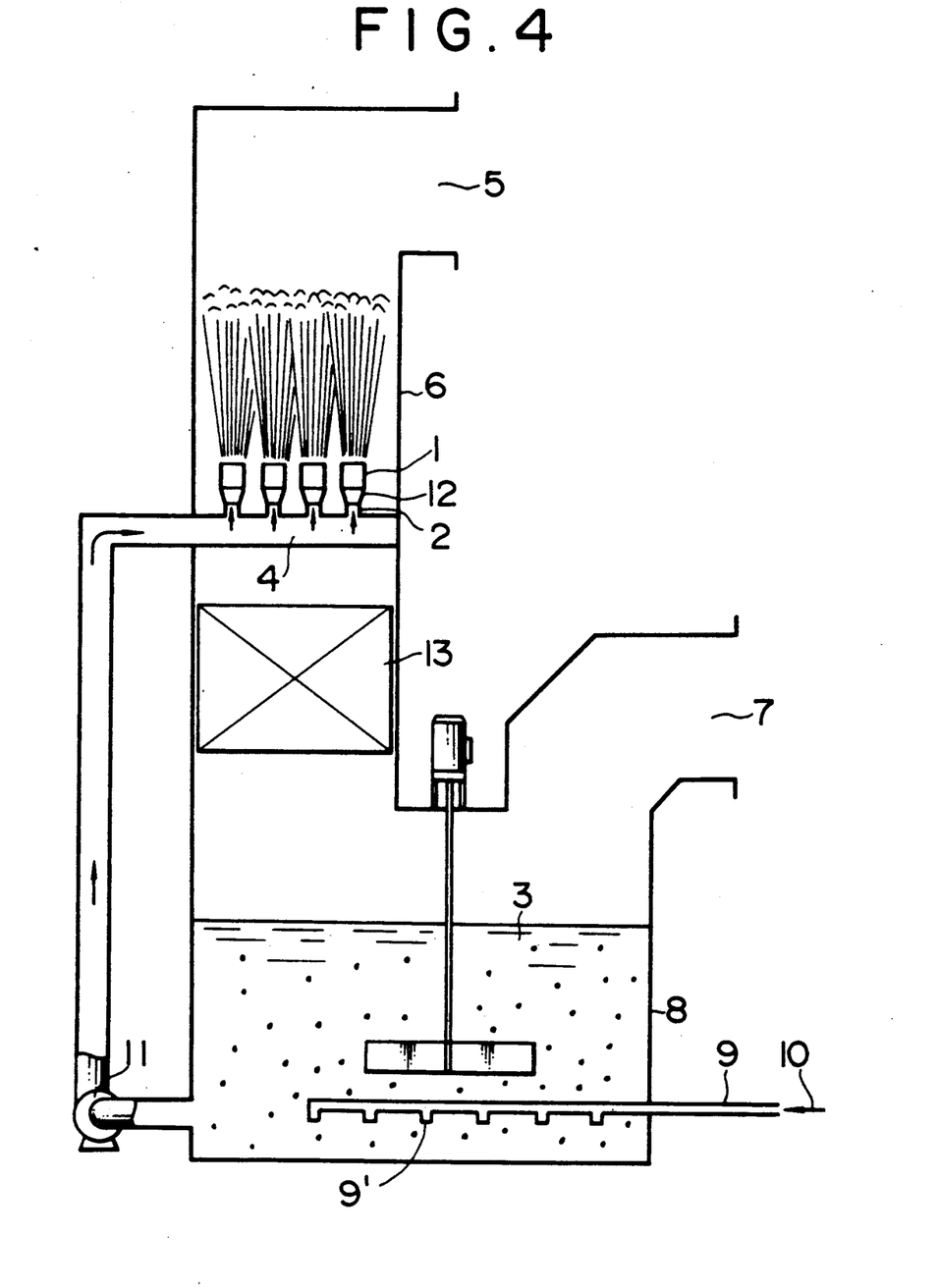

Using a gas-liquid contacting facility shown in FIG. 4 gas-liquid contact was experimented by employing 14,000 m³N/h of an exhaust gas containing 700 ppm of $SO_2$ and a $CaCO_3$ slurry as the absorbing agent. The concentration of $CaCO_3$ in the gas absorbing liquid was 20 wt. %.

The gas-liquid contacting facility shown in FIG. 4 used in this embodiment has a packing below the header pipe of the gas-liquid contacting facility shown in FIG. 3. Components shown in FIG. 4 that are identical to those in FIG. 3 are shown with identical symbols.

The packing 13 is a lattice formed by piling 10 stages of material in which one stage consists of 36 sheets of a polypropylene plate with 4 mm thickness, 10 mm height and 500 mm width, so that the height of the packing is 1 m.

The throat pipe 2, the diffuser pipe 12 and the discharge pipe 1 used were the same as in the first embodiment.

Air was sent into the gas absorbing liquid at a rate of 150 m³N/h through the feeding pipe 9 provided for in the reservoir for the gas absorbing liquid, the gas absorbing liquid was sent to the header pipe at 230 m³/h, and an exhaust gas was introduced from above the top of the liquid columns of the gas absorbing liquid in the downward direction.

The temperature of the gas absorbing liquid was 15° C. and the measured internal pressure of the throat pipe was 10 mmHg (−750 mmHg with respect to the atmospheric pressure), the condition for lower pressure boiling of the gas absorbing liquid was satisfied.

The measured concentration of $SO_2$ in the exhaust gas flowing between the header pipe 4 and the packing 13 was 112 ppm. The $SO_2$ concentration at the outlet of the exhaust gas was 55 ppm. Therefore, the desulfurization factor at the liquid column part of the embodiment was 84%, the desulfurization factor at the packing was 51%, and the total desulfurization factor was 92%.

Third Comparative Example

For this example, a gas-liquid contacting facility used in the prior art as shown in FIG. 5 was employed in which the gas absorbing liquid that passes through the header pipe 4 is discharged in the upward direction into the interior of the tower main body 6 directly from the discharge pipes 1. The conditions for this example were identical to those of the fifth embodiment, except for that the throat pipe 2 and the diffuser pipe 12 were removed, and the inner diameter of the discharge pipe was 60 mm.

When the gas absorbing liquid with the same concentration as in the fifth embodiment was sent at the same rate of 230 m³/h, the concentration of $SO_2$ at the outlet of the exhaust gas was 125 ppm, and the concentration of $SO_2$ of the exhaust gas flowing between the header pipe 4 and the packing 13 was 210 ppm. Therefore, the desulfurization factor at the liquid column part of the present embodiment was 70%, the desulfurization factor around the packing was 40%, and the total desulfurization factor of the facility was 82%.

As shown in the above in the fifth embodiment and the third comparative example, it was confirmed that the gas-liquid contact efficiency at the packing was ameliorated, by the boiling of gas absorbing liquid under lower pressure in the upper region of the packing, by bringing the pressure of the gas absorbing liquid to below its vapor pressure.

The effects of the present invention are as shown below.

Generally speaking, in the gas-liquid contacting method for bringing a gas and a gas absorbing liquid into contact, there can be secured a satisfactory gas-liquid interaction by enhancing the dispersion of the squirted liquid and by suppressing the biased flows of the gas and the liquid.

The present invention can achieve a high gas-liquid contact efficiency between the gas absorbing liquid and the gas to be treated by the boiling of the gas absorbing liquid under lower pressure by bringing the pressure of the gas absorbing liquid to below its vapor pressure, and by dispersing the gas absorbing liquid into the gas by means of the dispersing tendency of the gas absorbing liquid. Biased flow of the gas and the liquid can be suppressed and a homogeneous contact realized between the gas and the liquid, enhancing the gas-liquid contact efficiency.

In addition, by realizing a gas-liquid contact on the upstream of the packing it is possible to enhance the gas-liquid contact efficiency in the packing.

Furthermore, it is possible to enhance the dispersion of the gas absorbing liquid due to low pressure boiling of the gas absorbing liquid, by blowing a gas into the gas absorbing liquid in advance, and to enhance the low pressure boiling of the gas absorbing liquid by means of using zeolites in the gas absorbing liquid, achieving a high gas-liquid contact effect.

We claim:

1. In a gas-liquid contacting method for bringing a gas absorbing liquid into contact with a gas to be treated, comprising the steps of boiling the gas absorbing liquid under low pressure by bringing the pressure of the gas absorbing liquid below its vapor pressure, then squirting the gas absorbing liquid into a flow of the gas to be treated to effect contact between the gas to treated and the gas absorbing liquid, wherein using a gas-liquid contacting facility comprising a tower forming a reservoir for the gas absorbing liquid at a bottom part thereof and a space for the flow of the gas to be treated in an upper part above the reservoir, a header pipe installed in the tower above the reservoir, a pump for feeding the gas absorbing liquid from the reservoir of the gas absorbing liquid to the header pipe, a cylindrically shaped throat pipe attached to the header pipe, a cylindrically shaped discharge pipe with cross-sectional area greater than the cross-sectional area of the throat pipe, and a frusto-conically shaped diffuser pipe connecting the throat pipe and the discharge pipe, whereby the gas absorbing liquid boils under low pressure by making the cross-sectional area of the throat pipe to be sufficiently smaller than the cross-sectional area of the discharge pipe, then the gas absorbing liquid is caused to squirt from the discharge pipe into the gas to be treated and the flow velocity of the liquid within the discharge pipe satisfies the following inequality:

$$Pw > Pt = Po - \frac{p \times (Vd)^2}{2xg} \times \left( \frac{1}{(m)^2} - 1 \right) + p \times \Delta H + \Delta Pl$$

where
 $p$ is the density of the gas absorbing liquid, and (kg/m³)
 g is the acceleration of the gravity, (m/S²)
 Pw is a vapor pressure of the gas absorbing liquid,
 Pt is the static pressure within the throat pipe,
 Po is the static pressure at the outlet of the discharge pipe,
 Vd is the flow velocity of the liquid within the discharge pipe,
 m is given by $$m = \frac{\text{(cross-sectional area of the throat pipe)}}{\text{(cross-sectional area of the discharge pipe)}},$$

$\Delta H$ is the height difference between the outlet of the discharge pipe and the throat pipe, and
 $\Delta Pl$ is the pressure loss of the flow path beyond the throat pipe.

2. A gas-liquid contacting method as claimed in claim 1, wherein providing a packing in the flow of the gas to be treated downstream of the squirting of the gas absorbing liquid.

3. A gas-liquid contacting method as claimed in claim 1, wherein blowing a gas into the gas absorbing liquid in advance of squirting the gas absorbing liquid into the gas flow.

4. A gas-liquid contacting method as claimed in claim 1, wherein adding a zeolite into the gas absorbing liquid before treating the gas flow with the liquid.

* * * * *

UNITED STATES PATENT AND TRADEMARK OFFICE
CERTIFICATE OF CORRECTION

PATENT NO. : 5,053,061
DATED : October 1, 1991
INVENTOR(S) : Atsushi Tatani, Susumu Okino, Masakazu Onizuka It is certified that error appears in the above-identified patent and that said Letters Patent is hereby corrected as shown below:

On the title page, item [73] should read as follows:

--[73] Assignee: Mitsubishi Jukogyo Kabushiki Kaisha, Tokyo, Japan--.

Signed and Sealed this

Twenty-fifth Day of May, 1993

Attest:

MICHAEL K. KIRK

Attesting Officer  Acting Commissioner of Patents and Trademarks